United States Patent [19]

Wernsing

[11] Patent Number: 4,994,665

[45] Date of Patent: Feb. 19, 1991

[54] APPARATUS FOR PROVIDING A REMOTELY DISCERNIBLE SIGNAL UPON PARTURITION OF A PREGNANT LIVESTOCK OR ZOOLOGICAL ANIMAL

[76] Inventor: William O. Wernsing, 125 Northview Rd., Ithaca, N.Y. 14850

[21] Appl. No.: 461,109

[22] Filed: Jan. 4, 1990

[51] Int. Cl.$^5$ .......... G01V 9/04

[52] U.S. Cl. .......... 250/221; 128/775; 340/573

[58] Field of Search .......... 250/221, 215; 340/573, 340/870.09, 870.16; 128/775, 903

[56] References Cited

U.S. PATENT DOCUMENTS 4,028,687 6/1977 Hamaguchi et al. .......... 128/775

4,217,575 8/1980 Lorette .......... 340/573

*Primary Examiner*—David C. Nelms

*Attorney, Agent, or Firm*—Charles S. McGuire

[57] ABSTRACT

A device to detect parturition of a pregnant livestock or zoological animal which may be inserted into the birth canal of the pregnant animal comprises a transparent housing having an internal cavity adapted to hold therein a photo-detecting element which is dormant while in the dark birth canal. When the housing is expelled from the birth canal by a fetus pushing it out at parturition, the brighter environment activates the photo-detector which drives associated circuitry which activates an integral tone generator to cause it to emit a pulsed, high frequency tone. A remotely located receive identifies the tone from the ejected device and activates any one of known, ultimate alerting devices, such as a radio paging system, for example.

20 Claims, 1 Drawing Sheet

APPARATUS FOR PROVIDING A REMOTELY DISCERNIBLE SIGNAL UPON PARTURITION OF A PREGNANT LIVESTOCK OR ZOOLOGICAL ANIMAL

BACKGROUND OF THE INVENTION

This invention relates to apparatus for automatically detecting parturition of a pregnant livestock or zoological animal and, more specifically, in one aspect to a light-sensitive device which may be inserted and held within the birth canal of a pregnant animal which, upon expulsion by a fetus at parturition, provides a remotely dicsernible signal and, in a second aspect, to a device which may be inserted and held within the birth canal of a pregnant animal which, upon expulsion therefrom, provides a sonic or ultrasonic tone which is remotely received by apparatus which includes means to automatically alert remotely located attendants whereby they may be summoned from other duties to aid the animal and its offspring as needed.

In the business of raising and breeding livestock or in zoological activities, it is often desirable for someone to be in attendance at, or soon following, the birth of certain animals since medical attention and assistance is often required by the mother and/or her offspring. Apparatus to detect the onset of delivery and automatically alert a remotely located attendant have taken forms which include devices inserted into the birth canal of a pregnant animal for actuation upon expulsion by a fetus at parturition. An example of such a device may be seen in U.S. Pat. No. 4,028,687, issued to Hamaguchi et al on June 7, 1977. In one embodiment, the Hamaguchi device uses electrodes which are short-circuited by the body of the animal when inserted into the birth canal to achieve a non-actuated condition. When expelled by a fetus at parturition, the short-circuit ceases to exist whereupon a buzzer integral to the inserted device is triggered to alert the attendant. In this embodiment, it is clear that the attendant must be within an audible range of the buzzer and must therefore not be absent from the immediate area of the birth place. It is also conceivable that upon ejection, the device may encounter other matter extraneous yet adjacent to the animal which would unintentionally short-circuit the device and render it useless. In a second embodiment, a radio transmitter is inserted into the birth canal of the animal. Upon expulsion by a fetus, the transmitter emits signals at a predetermined frequency which are received by a fixed receiver to activate a buzzer positioned within an audible range of an attendant.

It is a principal object of the present invention to provide a device which will automatically detect parturition of a pregnant livestock or zoological animal to alert an attendant located a significant distance from the place of birth.

It is another object to provide such a device which is easily inserted into the birth canal of a pregnant livestock or zoological animal and which is activated upon expulsion by a fetus passing through the birth canal at parturition.

It is still another object to provide such a device which is dormant while in the dark birth canal yet activates a discernible signal upon expulsion from the birth canal due to a higher level of brightness impinging upon the expelled device.

It is a further object to provide such a device which includes means to emit a sonic or ultrasonic tone upon expulsion by a fetus, the tone being remotely received by apparatus which includes means to activate any of a variety of known alerting devices such as a radio paging system, for example.

It is still a further object to provide such a device which is easy to manufacture, economical and extremely reliable.

Other objects will in part be obvious and will in part appear hereinafter.

SUMMARY OF THE INVENTION

The present invention comprises a device which may be inserted into the birth canal of a pregnant livestock or zoological animal to detect parturition. The invention includes means to send a signal to a remote receiver which may trigger any of a variety of ultimate alerting devices to summon an attendant absent from the immediate birth area so that he may be called to assist the newborn animal and mother as needed.

The inserted device includes means to activate a tone generator integral to the inserted device and, in the preferred embodiment to be described herein, the activation means comprises a light-sensitive electrical element, such as a photo-resistor, photo-semiconductor or photo-voltaic cell, held within a housing which allows light to enter into its internal cavity. When inserted into the dark birth canal, the device is inactive. When expelled from the birth canal by a fetus passing therethrough, the photo-detector within the housing is activated by the brighter environment outside the birth canal. When thus activated, the photo-detector drives associated circuitry which triggers the aforementioned sonic or ultrasonic tone generator.

A pulsed or otherwise unique tone can be incorporated as needed in order to allow the receiver, to be described below, to discriminate between the desired signal and unwanted noise.

A sonic or ultrasonic receiver is located at some nearby convenient location and comprises one or more microphones whose outputs are mixed, an amplifier, and suitable filtering and signal processing means. A plurality of microphones allows several animals to be monitored simultaneously with any one birth triggering the receiver. The filtering provides a means of attenuating unwanted noise while being sensitive to the unique tone characteristics emitted by the expelled device so as to reduce the chance of false triggering.

Finally, a relay closure or electronic switch is attached to the receiver which may be used to trigger any one or more of many available ultimate alerting devices, for example a radio paging system, a telephone message dialing system, an audible bell or buzzer, a light, or a carrier current communicating system. Many of these devices can accommodate multiple inputs which can be sent to multiple locations. A plurality of the above described receiver system could thereby be connected to a single, multichannel, radio paging system, for example, which would allow specific attendants to be summoned to specific areas.

DETAILED DESCRIPTION

Figure 1:
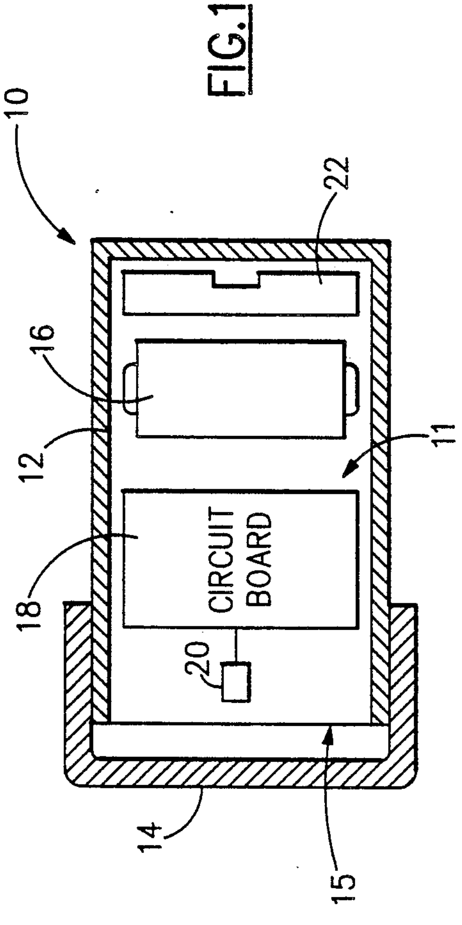
FIG. 1 is a side plan view of the inserted device shown in cross-section to reveal the elements held within the external housing.

Referring now to the drawings, there is seen in FIG. 1 the preferred embodiment of the device referenced generally by the numeral 10 which is inserted into the birth canal of a pregnant livestock or zoological animal. Housing 12 is configured to have an internal cavity 11 to hold the elements to be described. A removable cap 14 is provided to cover open end 15 of housing 12 and to protect the elements therein. It is also conceivable that housing 12 be formed as a unitary piece; however, it is preferred that the elements within cavity 11 be accessible so that they may be easily replaced. Housing 12 is preferably made of a non-toxic, biomedically acceptable material suitable for insertion into the birth canal of a pregnant animal. For example, the material may be latex rubber, medical grade ABS, polyethelene or other material suitable for this purpose and which may be sterilized by known means. Also, it is desirable that the outer perimeter of housing 12 be configured such that it may be easily inserted and held in the birth canal, not to be expelled therefrom until the fetus forcefully pushes it out at parturition. Means of holding housing 12 in the birth canal may be by the shape of the device itself whereby the walls of the birth canal frictionally hold device 10 in place, by suitable coverings to augment the friction of the walls of the birth canal, by tethering device 10 to outside the birth canal, or by yet other suitable means for this purpose. It should therefore be obvious that casing 12 may be configured in many shapes and sizes depending on the type of animal, the size of the birth canal and the desired means of holding device 10 within the birth canal.

Held within the internal cavity 11 of housing 12 is a power source such as battery 16 to drive associated circuitry mounted on circuit board 18. In the preferred embodiment as shown in the drawings, the circuitry includes photo-detector 20 which is electrically responsive to radiation of predetermined intensity and wavelength. In this embodiment, it is therefore required that casing 12 either be translucent, transparent or be provided with a window (not shown) adjacent to photo-detector 20 such that light or infrared radiation may enter cavity 11 to activate photo-detector 20 in the intended manner. Examples of photo-detectors which may be used for this purpose include photo-resistors, photo-semiconductors and photo-voltaic cells, which are relatively cheap and small in size. Thus, when the device 10 is inserted into the dark birth canal of a pregnant animal, photo-detector 20 is not receiving any light and is therefore unactivated. When device 10 is expelled from the birth canal by a fetus pushing it out at parturition, the level of ambient brightness increases and is allowed to pass through casing 12 to activate photo-detector 20. If the animal is normally held within an otherwise unlit stall, a suitable light source should be provided therein sufficient to activate photo-detector 20, which normally requires only a very slight level change in brightness to activate.

Activation of photo-detector 20 may by itself be used to activate an alerting device as seen in the prior art but, in the preferred embodiment, drives circuitry which, in turn, activates tone generator 22. It is also noted that other means may be employed to activate tone generator 22 upon expulsion by a fetus, such as those seen in the aforementioned prior art wherein photo-detector 20 of the present invention is merely the preferred method of activating tone generator 22.

Figure 2:
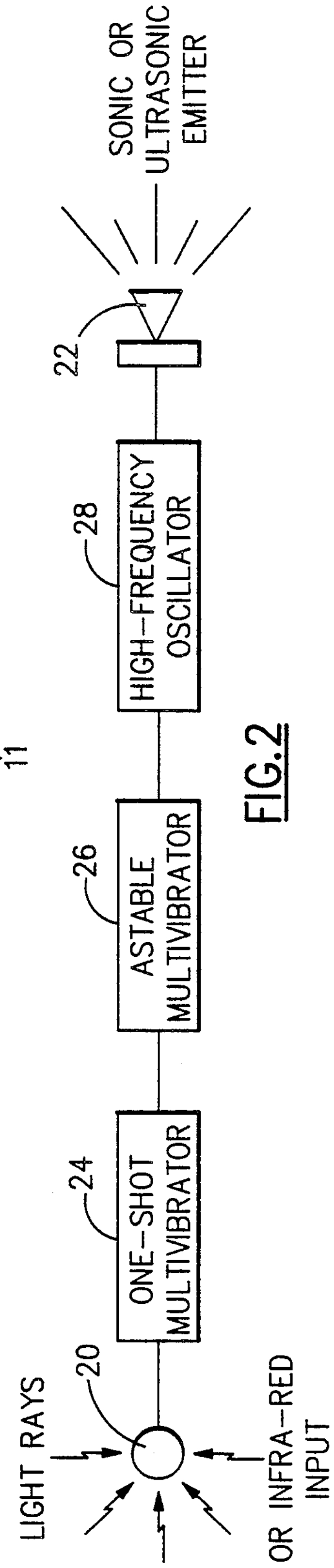
FIG. 2 is a functional block diagram of the internal components of the inserted device of FIG. 1.

Describing the preferred embodiment of the present invention now in more particularity, as seen in the functional block diagram of FIG. 2, when device 10 is expelled from the birth canal of the animal, any light present at the place of birth will pass through the walls of transparent casing 12 (or window therein) and activate photo-detector 20. Upon activation, photo-detector 20 will activate a circuit designed to allow tone generator 22 to be activated for a substantial duration from even a momentary change in the level of brightness. This circuit may take the form of a one-shot multivibrator, indicated by reference numeral 24, or other means to extend the decay time constant of photo-detector 20. Upon activation by photo-detector 20, one-shot multivibrator 24 will feed a signal to astable multivibrator 26 which will then generate a low frequency, rectangular waveform. The waveform thus generated by astable multivibrator 26 causes high frequency oscillator 28 to pulse on and off repetitively. Oscillator 28 drives a transducer or tone generator 22 which thereby radiates a pulsed, high frequency tone which may be either in the sonic or ultrasonic range. The purpose of pulsing the tone is to assist in the signal processing in the receiver (described below) so that a steady, high frequency tone, which might be present as background noise, will not give a false alarm. Only the properly pulsed, high frequency sound from ejected device 10 will be detected. It is contemplated that other known techniques and circuitry may be employed to assist the receiver to discriminate, in varying accuracy, between a tone emitted from ejected device 10 and background noise to reduce the possibility of false alarms. In this regard, pulsing the tone by use of oscillator 28 is one such way to achieve this objective and is preferred.

Figure 3:
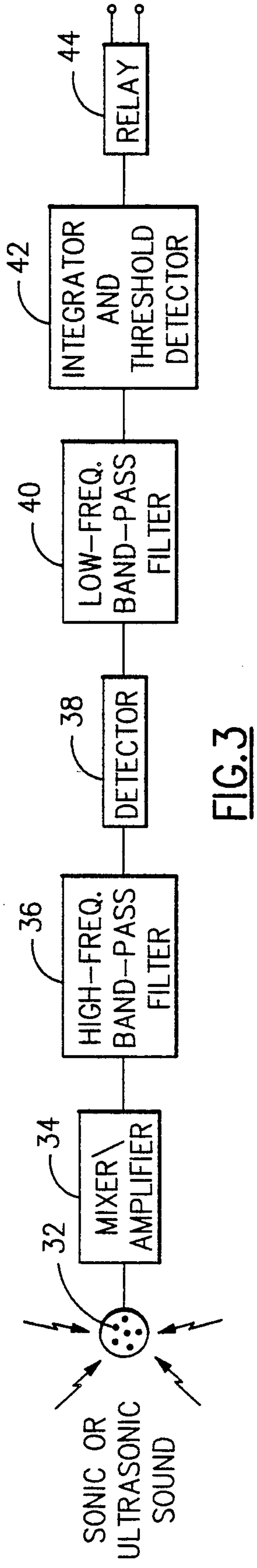
FIG. 3 is a functional block diagram of the various components of the receiving system of the invention.

Referring now to FIG. 3, there is seen a functional block diagram of the tone receiving apparatus of the invention. The microphone 32 for the sonic or ultrasonic receiver seen in FIG. 3 is located at some location near the birth place such that it may pick up the pulsed tone generated by expelled device 10. It is thus understood that the sound generated by tone generator 30 serves only as a short duration, data link to the receiving system of FIG. 3 and therefore device 10 is more simple in design than the radio transmitter of prior art and requires much less power to operate than the buzzer alerting system of prior art, which must generate tones of sufficient loudness and duration so that they may be directly heard by the attendants.

A microphone indicated by reference numeral 32 is provided to pick up the pulsed tone generated by tone generator 22 of expelled device 10. A plurality of microphones may be provided in a number of different birthing areas or stalls, each being connected to the receiving system of FIG. 3 such that more than one pregnant animal may be monitored on the same receiving system. It is contemplated that a purality of the receiving system seen in FIG. 2 may be connected to a single alerting system such as a multichannel, radio paging system. Each such receiving system would activate only its own channel and therefore only the corresponding paging devices would be triggered. The signal thus received can then be matched with a corresponding channel of the ultimate alerting device. This arrangement would be especially useful for zoos where many different types of animals are kept. Specific attendants are usually assigned to tend to specific animals and by utilizing the capabilities of a multi-channel alerting system, a specific attendant can be summoned to attend to the specific animal for which they care.

Microphone 32 feeds the high frequency, pulsed tone to mixer/amplifier 34. Mixing is provided when multiple inputs are fed into the receiving system seen in FIG. 3. The amplified signal passes through a narrow, high-frequency, band-pass filter 36 to reject to some degree all pickup but the desired high frequency tone emitted by tone generator 22. The output of band-pass filter 36 is then detected by detector 38, resulting in only the envelope of the high frequency waveforms remaining. This envelope signal passes through a low frequency, band-pass filter 40, which will reject any steady waveform and pass only the pulsed frequency. The integrator and threshold detector 42 reject transient signals that may momentarily pass through the filters 36 and 40. In this manner, all signals are more or less rejected except those of the correct tone and correct keying frequency, resulting in few, if any, false alarms.

A correct tone signaling the ejection of device 10 from the birth canal of a pregnant animal is fed from integrator/threshold detector 42 to relay 44. Relay closure 44 is used to trigger any one or more of known, ultimate alerting devices that are capable of alerting an attendant a significant distance from the place of birth. Other means may be used, as desired, to trigger the ultimate alerting device, such as an electronic switch, for example. Examples of possible ultimate alerting devices include a radio paging system, a telephone message dialing system, an audible bell or buzzer, a light, a carrier current communicating system, or any such alerting device. Many of these devices can accommodate multiple inputs which may be sent to multiple locations. Several of the described receiver systems could thereby be connected to a single multi-channel radio paging system, for example, as described earlier.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

What is claimed is:

1. Apparatus for providing a remotely discernible signal upon parturition of a pregnant livestock or zoological animal comprising:

(a.) a housing having an internal cavity and an exterior perimeter configured for insertion into the birth canal of said pregnant animal;

(b.) means to retain said housing within said birth canal and to allow said housing to pass through said birth canal upon a fetus pushing said housing from said birth canal upon parturition;

(c.) means within said internal cavity of said housing adapted to generate an electric signal upon ejection from said birth canal;

(d.) a tone generator connected to said electric signal means for actuation thereby in response to emission of said electric signal; and (e.) apparatus to remotely receive said tone generation, said receiving apparatus including means to provide a remotely perceivable signal whereby an attendant located a significant distance from the place of birth may be summoned to assist said animal and fetus as needed.

2. The invention according to claim 1 wherein said housing retaining means comprises an exterior perimeter of said housing configured for frictionally engaging with the walls of said birth canal upon insertion therein.

3. The invention according to claim 1 wherein said housing is configured to have an opening communicating with said internal cavity and including a cap removably covering said opening.

4. The invention according to claim 1 wherein said housing further includes means to allow radiation of at least a predetermined wavelength to enter said internal cavity of said housing upon expulsion from said birth canal by said fetus.

5. The invention according to claim 4 wherein said electric signal means comprises a photo-detector.

6. The invention according to claim 5 wherein said means allowing said radiation to enter said internal cavity comprises at least an area of said exterior perimeter of said housing adjacent said photo-detector sufficiently transparent to said radiation to permit the latter to enter said internal cavity of said housing to activate said photo-detector.

7. The invention according to claim 5 wherein said housing is made of translucent plastic.

8. The invention according to claim 5 wherein said photo-detector comprises at least one of a photo-semiconductor, photo-voltaic cell and a photo-resistor.

9. The invention according to claim 5 wherein said photo-detector is sensitive to the infrared spectrum.

10. The invention according to claim 1 wherein said tone generator is adapted to radiate a predetermined waveform upon actuation thereof by said electric signal.

11. The invention according to claim 10 wherein said predetermined waveform is a pulsed, high frequency waveform.

12. The invention according to claim 11 and further including, in combination:

(a.) an astable multivibrator adapted to generate a low frequency, rectangular waveform in response to said electric signal; and (b.) a high frequency oscillator connected to said astable multivibrator and adapted to pulse on and off repetitively in response to said rectangular waveform.

13. The invention according to claim 12 and further comprising means to extend the decay time constant of said electric signal means, said decay time constant extension means adapted to direct a signal of substantial duration to said astable multivibrator from even momentary activation of said electric signal means to cause activation of said tone generator.

14. The invention according to claim 12 and further comprising a one-shot multivibrator attached to said electric signal means and said astable multivibrator and adapted to direct a signal of substantial duration to said astable multivibrator from even momentary activation of said electric signal means to cause activation of said tone generator.

15. The invention according to claim 1 wherein said receiving apparatus comprises, in combination:

(a.) at least one microphone located a distance from said inserted apparatus sufficient to receive said generated tone upon expulsion of said device by said fetus at parturition;

(b.) means to amplify said generated tone;

(c.) means to filter said received generated tone whereby all signals are attenuated except said generated tone from said inserted device; and (d.) a relay or electronic switch connected to said filter means and including attachment means whereby any one of a plurality of known, ultimate alerting devices may be attached to said relay to alert a remotely located attendant.

16. The invention according to claim 15 wherein said filter means comprises a high-frequency band pass filter connected to said amplifing means and a low-frequency band pass filter connected to said high frequency band pass filter and said relay or electronic switch.

17. The invention according to claim 16 and further comprising a detector attached to said high frequency band pass filter and said low frequency band pass filter.

18. The invention according to claim 17 and further comprising an integrator and threshold detector connected to said low frequency band pass filter and said relay or electronic switch.

19. Apparatus for providing a remotely discernible signal upon parturition of a pregnant livestock or zoological animal comprising:

(a.) a housing having an internal cavity and an exterior perimeter configured for insertion into the birth canal of said pregnant animal, said housing including means allowing radiation of at least a predetermined wavelength to enter said internal cavity of said housing upon expulsion from said birth canal;

(b.) means to retain said housing within said birth canal and to allow said housing to pass through said birth canal upon a fetus pushing said housing from said birth canal upon parturition; and (c.) a photo-detecting element electrically responsive to said radiation positioned within said internal cavity of said housing; and (d.) means of providing a perceivable signal, said means being responsive to actuation of said photo-detecting element.

20. The invention according to claim 19 wherein said means comprises a transducer.

* * * * *